(12) United States Patent
Suzuki et al.

(10) Patent No.: US 9,086,030 B2
(45) Date of Patent: Jul. 21, 2015

(54) PISTON FOR INTERNAL COMBUSTION ENGINE

(75) Inventors: Nobuyuki Suzuki, Hamamatsu (JP); Takeshi Hiromatsu, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 14/131,403

(22) PCT Filed: Aug. 9, 2012

(86) PCT No.: PCT/JP2012/070323
§ 371 (c)(1),
(2), (4) Date: Jan. 7, 2014

(87) PCT Pub. No.: WO2013/022062
PCT Pub. Date: Feb. 14, 2013

(65) Prior Publication Data
US 2014/0158081 A1  Jun. 12, 2014

(30) Foreign Application Priority Data

Aug. 9, 2011  (JP) ................. 2011-174062

(51) Int. Cl.
*F02F 3/00* (2006.01)
*F16J 1/08* (2006.01)
(Continued)

(52) U.S. Cl.
CPC . *F02F 3/00* (2013.01); *F02F 3/027* (2013.01); *F16J 1/08* (2013.01); *F02B 3/06* (2013.01); *F02B 2075/025* (2013.01); *F05C 2201/021* (2013.01); *F05C 2201/0448* (2013.01)

(58) Field of Classification Search
CPC ............... F05C 2201/021; F05C 2201/0448; F02B 3/06; F02B 2075/025; F02F 3/00

USPC ....................................... 123/193.4
See application file for complete search history.

(56) References Cited

U.S. PATENT DOCUMENTS 4,528,950 A * 7/1985 Oblander et al. .......... 123/193.2
5,195,478 A * 3/1993 Kawabata et al. ......... 123/193.4
(Continued)

FOREIGN PATENT DOCUMENTS

JP  2006-275002  10/2006
JP  2007-509279   4/2007
(Continued)

OTHER PUBLICATIONS

Microfilm of the specification and drawings annexed to Japanese Utility Model Application No. 3193/1991 (laid open No. JP 4-88766), Toyota Motor Corp., Jul. 31, 1992.
(Continued)

*Primary Examiner* — Lindsay Low
*Assistant Examiner* — Charles Brauch
(74) *Attorney, Agent, or Firm* — Barnes & Thornburg LLP

(57) ABSTRACT

A piston capable of reducing the frictional resistance between skirt portion and a cylinder inner surface and improving fuel efficiency is provided. The invention is a piston for an internal combustion engine wherein when the piston slides along a cylinder inner surface, a high surface pressure portion occurs at a center of each skirt portion and low surface pressure portions occur at both sides of the high surface pressure portion. The high surface pressure portion of plural portions is provided with a horizontal groove. The low surface pressure portions of the plural portions are provided with an inclined groove that is inclined downward toward the high surface pressure portion and that is connected to an end portion of the horizontal groove.

6 Claims, 6 Drawing Sheets

(51) Int. Cl.
*F02F 3/02* (2006.01)
*F02B 3/06* (2006.01)
*F02B 75/02* (2006.01)

(56) References Cited

U.S. PATENT DOCUMENTS

| | | | |
|---|---|---|---|
| 7,171,936 B2 | 2/2007 | Rein et al. | |
| 8,061,324 B2* | 11/2011 | Dauphin | 123/193.4 |
| 2005/0005882 A1* | 1/2005 | Bauer et al. | 123/90.12 |
| 2005/0087166 A1* | 4/2005 | Rein et al. | 123/193.4 |

FOREIGN PATENT DOCUMENTS

| | | |
|---|---|---|
| JP | 2007-321860 | 12/2007 |
| JP | 2009-030521 | 2/2009 |
| WO | WO 2005/042953 | 5/2005 |

OTHER PUBLICATIONS

International Search Report issued in App. No. PCT/JP2012/070323 (2012).

* cited by examiner

PISTON FOR INTERNAL COMBUSTION ENGINE

TECHNICAL FIELD

Cross Reference to Related Applications

This patent application is a U.S. nationalization under 35 USC §371 of International Application No. PCT/JP2012/070323, filed Aug. 9, 2012, which claims priority to Japan Patent Application No. 2011-174062, filed Aug. 9, 2011. The disclosures set forth in the referenced applications are incorporated herein by reference in their entireties.

The present invention relates to a piston for an internal combustion engine (hereinafter, sometimes referred to simply as "piston") and, more particularly, to a construction of grooves formed in skirt portions of the piston.

BACKGROUND ART

A common internal combustion engine is constructed so that up-down motion of a piston housed within a cylinder is transmitted to a crankshaft via a connecting rod and therefore the crankshaft rotates. Furthermore, generally, skirt portions are formed on an outer peripheral portion of the foregoing piston.

Incidentally, the piston operates in a wide range of lubrication condition among a boundary lubrication region, mixed lubrication region, and hydrodynamic lubrication region on the Stribeck curve, according to operation conditions of the internal combustion engine. Therefore, the lubrication situation differs between a thrust side and a counter-thrust side on the piston, and the lubrication situation also differs depending on sites on the piston.

Such differences in the lubrication situation occur within the foregoing skirt portions as well. That is, when the piston slides along an inner surface of the cylinder, plural portions that differ in surface pressure occur in each skirt portion. Of the plural portions, a portion where the surface pressure is high (a high surface pressure portion) has a state in which the oil film is thin; in particular, the oil film becomes thinnest when the piston reaches the top dead center. In connection with this, there arises a problem that seizure or abrasion is likely to occur.

Therefore, for the purpose of retaining lubricating oil on the skirt portions, a method in which a lubricating oil sump is formed on outer peripheral surfaces of the skirt portions by patterning that uses laser or a cutting process has been proposed. Furthermore, there also has been proposed a method in which the outer peripheral surface of the skirt portions is subjected to a surface treatment in order to improve anti-seizure property and sliding characteristic in the boundary lubrication region or the mixed lubrication region in which solid contact (contact between the skirt portions and the cylinder inner surface) occurs microscopically.

Still further, a method in which the patterning and the surface treatment, both mentioned above, are simultaneously performed on the outer peripheral surfaces of the skirt portions has also been proposed. As an inexpensive, simple and convenient example of this method there exists patterning performed on a resin coat. Further, there also has been proposed a method in which patterning is performed so that when the piston slides, lubricating oil will be guided from both end portions (low surface pressure portions) of the outer peripheral surface of the skirt portions to a central portion thereof (high surface pressure portion) (refer to the patent documents 1 and 2).

PRIOR ART DOCUMENTS

Patent Documents

Patent Document 1: Japanese Patent Application Publication No. 2009-30521
Patent Document 2: Published Japanese Translation of PCT Application No. 2007-509279

SUMMARY OF THE INVENTION

Problem to be Solved by the Invention

However, each of the pistons described in the patent documents 1 and 2 is poor in performing the function of retaining lubricating oil on a central portion of the outer peripheral surface of the skirt portions. Therefore, when the piston slides, there is risk that the oil film on the central portion of the outer peripheral surface of the skirt portions becomes thin and the frictional resistance between the skirt portions and the cylinder inner surface becomes great so that decline in fuel efficiency may be brought about.

Furthermore, as for the piston described in the patent document 2, although a center of the skirt portions is provided with a storage channel for lubricating oil (refer to FIG. 3 and FIG. 3A in the same document), the amount of lubricating oil stored is insufficient. Still further, since this storage channel is provided in parallel with the sliding directions (up and down directions) of the piston, there exists a problem that the lubricating oil in the storage channel is apt to decrease in amount as the piston slides.

Therefore, taking the foregoing circumstances into account, it is an object of the present invention to provide a piston capable of reducing the frictional resistance between the skirt portions and the cylinder inner surface and improving fuel efficiency.

Solution to the Problem

An aspect of the present invention is a piston for an internal combustion engine wherein when the piston slides along a cylinder inner surface, a high surface pressure portion occurs at a center of a skirt portion and low surface pressure portions occur at both sides of the high surface pressure portion. The high surface pressure portion is provided with a horizontal groove. The low surface pressure portions are provided with an inclined groove that is inclined downward toward the high surface pressure portion and that is connected to an end portion of the horizontal groove.

Due to adoption of this construction, it becomes possible to cause lubricating oil to smoothly flow from the low surface pressure portions into the high surface pressure portion when the piston ascends and to hold a part of the lubricating oil in the high surface pressure portion when the piston descends. Therefore, even when the piston reaches the top dead center, a certain amount of the lubricating oil can be retained in the high surface pressure portion so as to restrain solid contact between the high surface pressure portion and the cylinder inner surface. In connection with this, it becomes possible to reduce the frictional resistance between the high surface pressure portion and the cylinder inner surface and improve fuel efficiency.

Furthermore, the horizontal groove may be provided with a retainer portion where the horizontal groove partially expands in at least one of up and down directions.

By adopting this construction, it becomes possible to cause the retainer portion to retain a certain amount of the lubricating oil when the piston ascends or descends, so that the function of causing the high surface pressure portion to retain the lubricating oil further improves. In connection with this, it becomes possible to more effectively restrain the solid contact between the high surface pressure portion and the cylinder inner surface, and it becomes possible to further reduce the frictional resistance between the high surface pressure portion and the cylinder inner surface.

Furthermore, the inclined groove may be provided with a retainer portion where the inclined groove partially expands in at least one of the up and down directions.

By adopting this construction, a certain amount of the lubricating oil can be retained in the low surface pressure portions as well as in the high surface pressure portion when the piston ascends or descends, and the function of causing the skirt portion to retain the lubricating oil further improves.

Still further, the horizontal grooves and the inclined grooves spaced by a predetermined interval may be provided in plural stages in the up and down directions, and a recess portion independent of the horizontal grooves and the inclined grooves may be provided between the horizontal grooves and between the inclined grooves.

Due to the adoption of this construction, it becomes possible to cause the recess portion to always retain a certain amount of the lubricating oil, and the function of causing the skirt portion to retain the lubricating oil further improves.

Effects of the Invention

According to several aspects of the present invention, it becomes possible to provide a piston capable of reducing the frictional resistance between the skirt portion and the cylinder inner surface and improving fuel efficiency.

DESCRIPTION OF EMBODIMENTS

Hereinafter, preferred embodiments of a piston 1 in accordance with the present invention will be described on the basis of the drawings.

First Embodiment

Firstly, a first embodiment of the present invention will be described using FIG. 1, FIG. 2A, and FIG. 2B. Incidentally, for convenience in description, this embodiment will be described with regard to the case where a left side in FIG. 1 is assumed to be a front elevation side (front side) of the piston 1.

Figure 1:
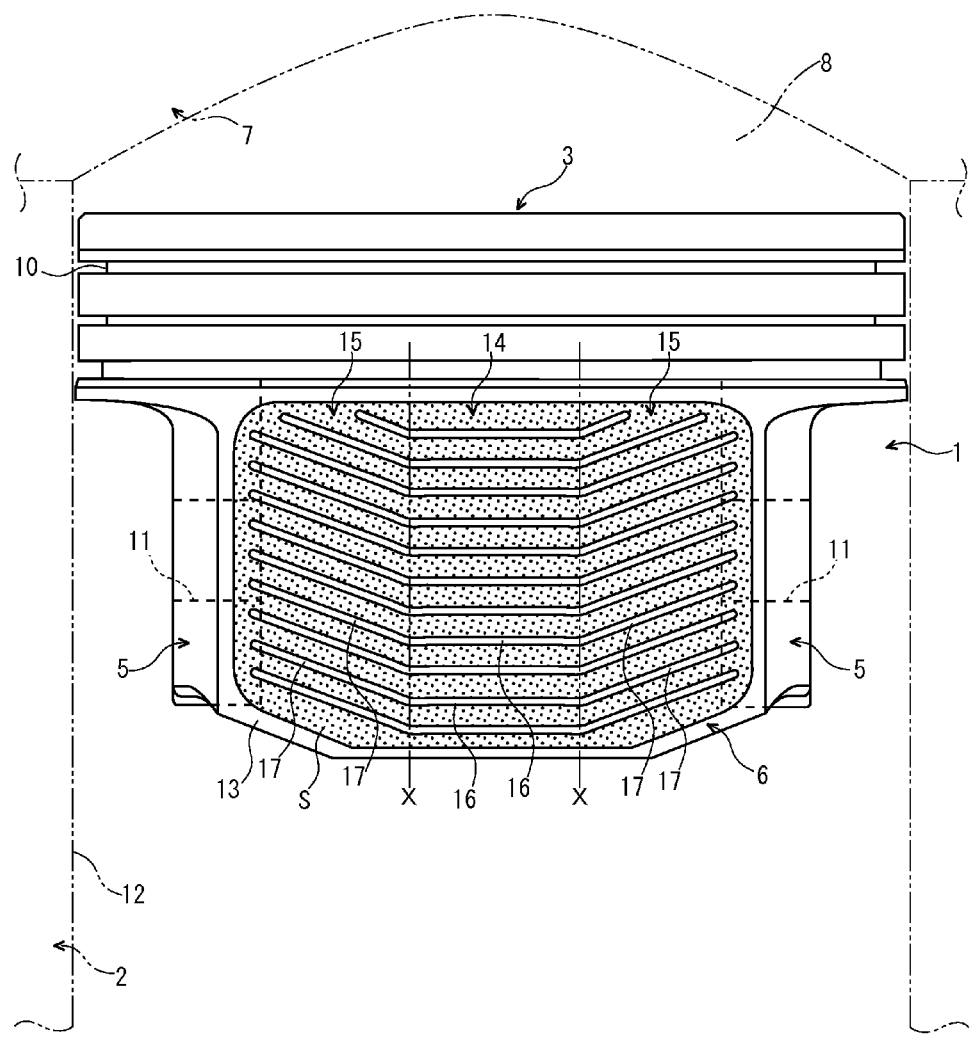
FIG. 1 is a side view showing a piston in accordance with a first embodiment of the invention.

As shown in FIG. 1, the piston 1 is housed in a cylinder 2 of an internal combustion engine so as to be capable of ascending and descending. The piston 1 is formed from an aluminum alloy material or the like so as to have a cylindrical shape with a lid. The piston 1 includes a crown portion 3 provided at an upper end of the piston 1, a pair of front and rear pin boss portions 5 that extend downward from both front and rear sides of the crown portion 3, and a pair of left and right skirt portions 6 (FIG. 1 shows only the near-side skirt portion 6) that extend downward from an outer periphery of the crown portion 3.

Above the crown portion 3, a combustion chamber 8 is formed between the cylinder 2 and a cylinder head 7. The outer periphery of the crown portion 3 is provided with an annular ring groove 10. A piston ring (not shown) is attached to the ring groove 10.

Each of the pin boss portions 5 is provided with a pin hole 11 in a horizontal direction. Although not shown in the drawings, a piston pin is attached to the pin holes 11. Via the piston pin, a connecting rod is connected to the piston 1. A crankshaft is connected to the connecting rod. Then, the up-down motion of the piston 1 is converted into rotation of the crankshaft via the connecting rod.

Each skirt portion 6 curves in the shape of an arc along a cylinder inner surface 12. An outer peripheral surface 13 of each skirt portion 6 is provided with a resin coat. This resin coat is formed by, for example, applying to the outer peripheral surface 13 of each skirt portion 6 an agent in which a solid lubricant, such as molybdenum disulfide, graphite, PTFE, etc., is dispersed in a thermosetting resin, such as polyamide imide or the like, by a method such as a spray method, a screen printing method, a pad printing method, etc., so that portions with an application of the agent make protrusion portions and portions without the application of the agent make recess portions (lubricating oil sumps). Incidentally, in FIG. 1, FIG. 2A, and FIG. 2B, agent-applied portions S (resin coat portions S) are presented with many dots (FIG. 3 and subsequent drawings are also illustrated similarly).

When the piston 1 slides as the internal combustion engine is operated, the outer peripheral surface 13 of each skirt portion 6 does not have a uniform stress distribution, plural portions different in surface pressure occur. For example, in the case of the skirt portions 6 in the embodiment, a portion with higher surface pressure (hereinafter, referred to as "high surface pressure portion 14") of the plural portions occurs at a center of each skirt portion 6 in the front and rear directions, and portions with lower surface pressure (hereinafter, referred to as "low surface pressure portions 15") of the plural portions occur on both the front and rear sides of the high surface pressure portion 14. Incidentally, two-dot chain lines X, X shown in FIG. 1, FIG. 2A, and FIG. 2B indicate boundaries between the high surface pressure portion 14 and the low surface pressure portions 15 FIG. 3 and subsequent drawings are also illustrated similarly).

The high surface pressure portion 14 of each skirt portion 6 is provided with horizontal grooves 16 in a horizontal direction (front and rear directions in this embodiment). The horizontal grooves 16 are provided substantially parallel with the ring groove 10 of the crown portion 3. The horizontal grooves 16 are formed by the patterning on the resin coat mentioned above. That is, the portions that are not provided with the resin coat (non-agent-applied portions) are the horizontal grooves 16. The horizontal grooves 16 are provided in plural stages in up and down directions and spaced by predetermined intervals.

The low surface pressure portions 15 of each skirt portion 6 are provided with inclined grooves 17 that are inclined downward toward the high surface pressure portion 14. The inclination angle of the inclined grooves 17 with respect to the horizontal direction is 5 degrees to 60 degrees and, more preferably, 10 degrees to 30 degrees. The inclined grooves 17, similar to the foregoing horizontal grooves 16, are formed by patterning on the resin coat. That is, the portions not provided with the resin coat (non-agent-applied portions) are the inclined grooves 17. The inclined grooves 17 are provided in plural stages in the up and down directions and spaced by predetermined intervals, and high surface pressure portion 14-side end portions of the inclined grooves 17 are connected to both end portions of the horizontal grooves 16.

In an above-described construction, when the piston 1 reaches the top dead center, an oil film on the outer peripheral surface 13 of each skirt portion 6 becomes thinnest and, in connection with this, microscopic solid contact between the high surface pressure portion 14 and the cylinder inner surface 12 becomes likely to occur and therefore seizure and abrasion as well as increased friction resistance become likely to occur. In this embodiment, however, these problems are avoided in the following manner.

Figure 2A:
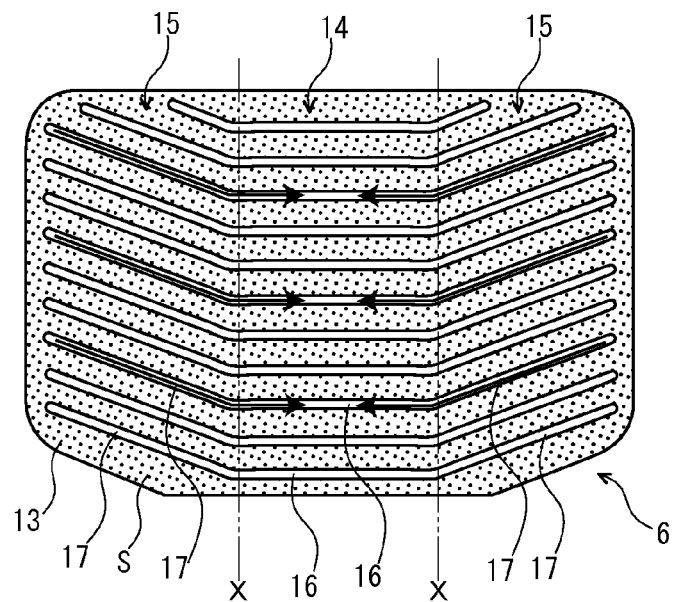
FIG. 2A and FIG. 2B show a skirt portion of the piston in accordance with the first embodiment of the invention, FIG. 2A being a side view showing flows of lubricating oil when the piston ascends, and FIG. 2B being a side view showing flows of the lubricating oil when the piston descends.

Firstly, when the piston 1 ascends, lubricating oil flows from the inclined grooves 17 into the horizontal grooves 16 as shown by arrows in FIG. 2A, so that the lubricating oil is supplied from the low surface pressure portions 15 to the high surface pressure portion 14. At that time, the lubricating oil smoothly flows along the inclined grooves 17 into the horizontal grooves 16 since the inclined grooves 17 are inclined downward toward the high surface pressure portion 14. In connection with this, the lubricating oil is concentrated to the high surface pressure portion 14, where the oil film becomes thin and the state of lubrication becomes harsh, so that the thinning of the oil film on the high surface pressure portion 14 can be restrained.

Figure 2B:
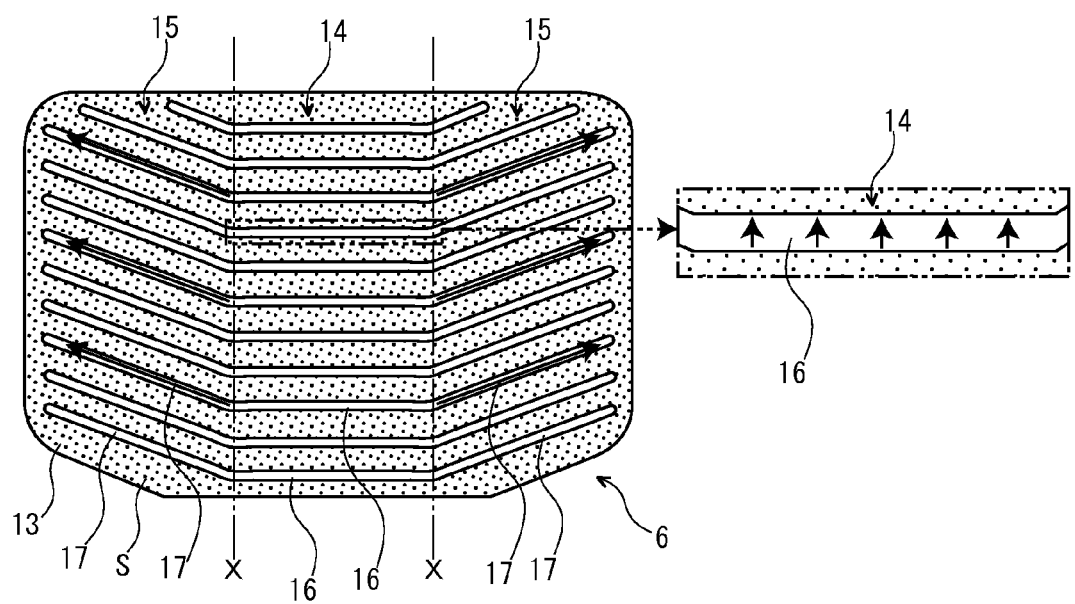

Furthermore, when the piston 1 descends, a part of the lubricating oil flows out from both end portions of the horizontal grooves 16 into the inclined grooves 17, as shown by obliquely lateral arrows in FIG. 2B. On the other hand, another part of the lubricating oil is retained within the high surface pressure portion 14 due to the horizontal grooves 16, instead of flowing into the inclined grooves 17, as shown by upward arrows in an enlarged partial view in FIG. 2B.

Thus, in this embodiment, the outer peripheral surface 13 of each skirt portion 6 is divided into regions according to difference of surface pressures that occur when the piston 1 slides, and the high surface pressure portion 14 and the low surface pressure portions 15 are provided with grooves 16, 17, respectively, that have different patterns. Then, the lubricating oil is allowed to smoothly flow from the low surface pressure portions 15 into the high surface pressure portion 14 when the piston 1 ascends, and a part of the lubricating oil is retained in the high surface pressure portion 14 when the piston 1 descends. Therefore, it becomes possible to make the oil film on the high surface pressure portion 14 thicker than that in the related art, so that a certain amount of lubricating oil can be retained in the high surface pressure portion 14 even when the piston 1 reaches the top dead center. In connection with this, the solid contact between the high surface pressure portion 14 and the cylinder inner surface 12 can be restrained, and reduction of the frictional resistance between the high surface pressure portion 14 and the cylinder inner surface 12 becomes possible; therefore, sliding property and fuel efficiency improve.

Furthermore, in this embodiment, since the horizontal grooves 16 and the inclined grooves 17 are formed by patterning on the resin coat provided on the outer peripheral surface 13 of each skirt portion 6, it becomes possible to form the horizontal grooves 16 and the inclined grooves 17 by an inexpensive and easy method. Furthermore, since the resin coat enhances the lubricating function of the skirt portions 6 and the horizontal grooves 16 and the inclined grooves 17 enhance the lubricating oil-retaining function, it becomes possible to further reduce the frictional resistance between the high surface pressure portion 14 and the cylinder inner surface 12 and therefore allow fuel efficiency to be improved.

Although in this embodiment, the horizontal grooves 16 and the inclined grooves 17 are formed by patterning on the resin coats, patterning may instead be performed directly on the outer peripheral surface 13 of each skirt portion 6 by a laser process or a mechanical process (cutting process) in other different embodiments.

Although in this embodiment, the horizontal grooves 16 and the inclined grooves 17 spaced by predetermined intervals are provided in plural stages in the up and down directions, horizontal groove 16 and inclined groove 17 may be provided in single stage in other different embodiments.

Second Embodiment

Next, a second embodiment of the invention will be described using FIG. 3 and FIG. 4. Incidentally, constructions of portions other than the high surface pressure portion 14 of each skirt portion 6 are substantially the same as those in the first embodiment, and descriptions thereof will be omitted.

Figure 3:
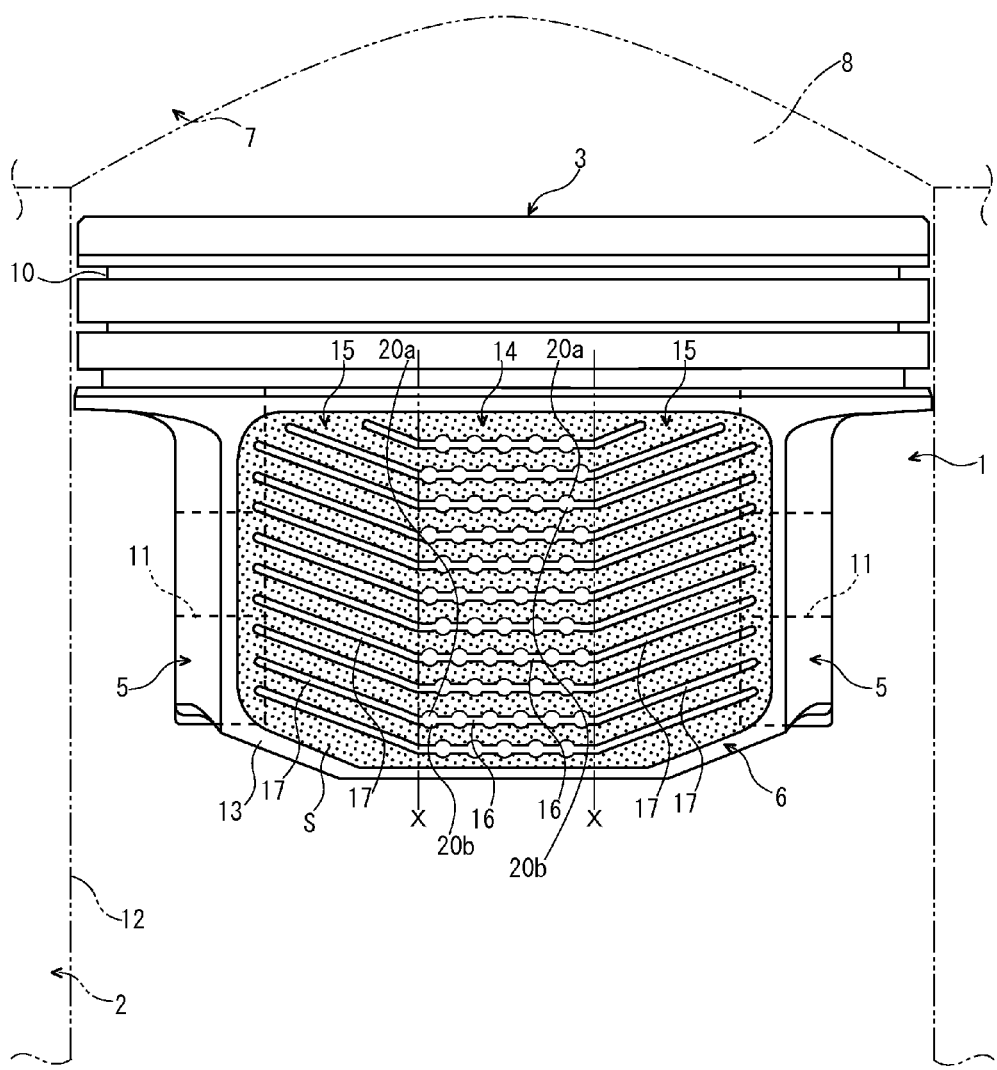
FIG. 3 is a side view showing a piston in accordance with a second embodiment of the invention.

As shown in FIG. 3, each horizontal groove 16 of the high surface pressure portion 14 is provided with several upper-side retainer portions 20a where each horizontal groove 16 partially expand upward, and also with several lower-side retainer portions 20b where each horizontal groove 16 partially expands downward. The retainer portions 20a, 20b are formed by patterning on resin coats. That is, the portions not provided with the resin coat (non-agent-applied portions) are retainer portions 20a, 20b.

Figure 4:
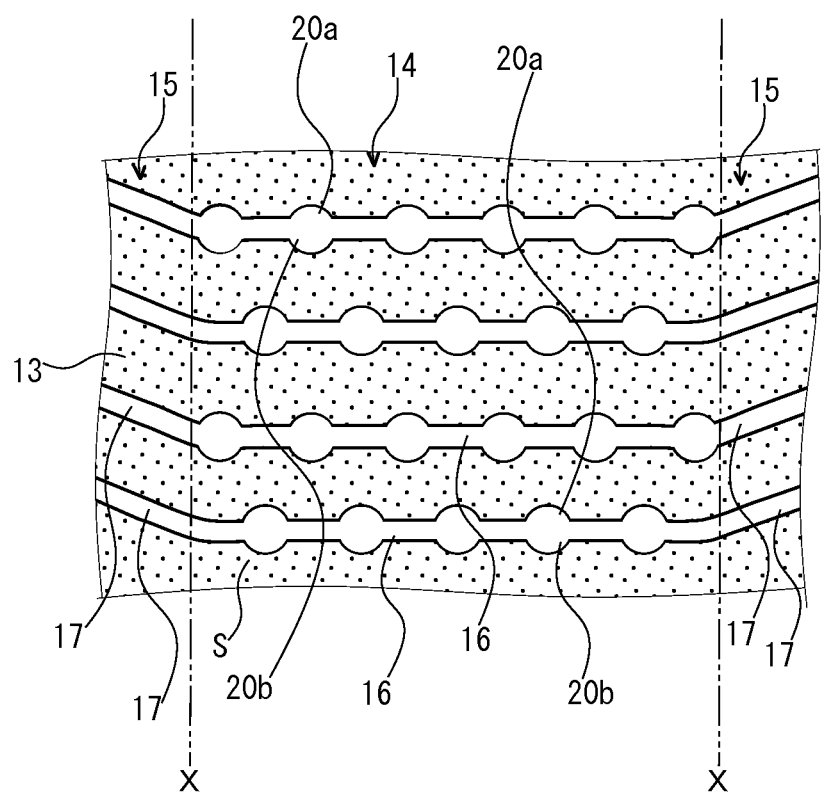
FIG. 4 is an enlarged view of a significant portion of what is shown in FIG. 3.

As best shown in FIG. 4, each of the retainer portions 20a, 20b has a semi-circular shape, and the upper-side retainer portions 20a and the lower-side retainer portions 20b are provided at mutually corresponding positions. This configuration and arrangement of the retainer portions 20a, 20b can easily be realized by combining a linear pattern of the horizontal grooves 16 with a perfect-circular pattern.

The retainer portions 20a, 20b formed on one of the horizontal groove 16 and the retainer portions 20a, 20b formed on another of the horizontal groove 16 immediately above or below the one of the horizontal groove 16 differ in position in the front and rear directions. That is, the positions of the retainer portions 20a, 20b of horizontal grooves 16 disposed adjacent to each other in the up and down directions do not overlap with each other.

In an above-described construction, the retainer portions 20a, 20b are less subject to influences associated with the sliding of the piston 1, and the lubricating oil is retained in the upper-side retainer portions 20a when the piston 1 descends, and the lubricating oil is retained in the lower-side retainer portions 20b when the piston 1 ascends. In connection with this, it becomes possible to prevent the lubricating oil from flowing out of the horizontal grooves 16 to the inclined grooves 17, so that when the piston 1 ascends or descends, a certain amount of lubricating oil can be retained in the high surface pressure portion 14, and therefore the solid contact between the high surface pressure portion 14 and the cylinder inner surface 12 can be more effectively restrained. In connection with this, it becomes possible to further reduce the frictional resistance between the high surface pressure portion 14 and the cylinder inner surface 12.

Although in this embodiment, the retainer portions 20a, 20b are semicircular, the retainer portions 20a, 20b may also have a shape other than semicircular, such as a triangular or quadrangular shape, etc., in other different embodiments. Furthermore, although the embodiment has been described in conjunction with the case where each horizontal groove 16 is provided with both the upper-side retainer portions 20a and the lower-side retainer portions 20b, each horizontal groove 16 may be provided with either only upper-side retainer portions 20a or only lower-side retainer portions 20b in other different embodiments. However, in order to reliably cause the high surface pressure portion 14 to retain a certain amount of lubricating oil during a descent period of the piston 1, when the lubricating oil is likely to flow out of the high surface pressure portion 14 to the low surface pressure portions 15, it is preferable that at least upper-side retainer portions 20a be formed.

Third Embodiment

Figure 5:
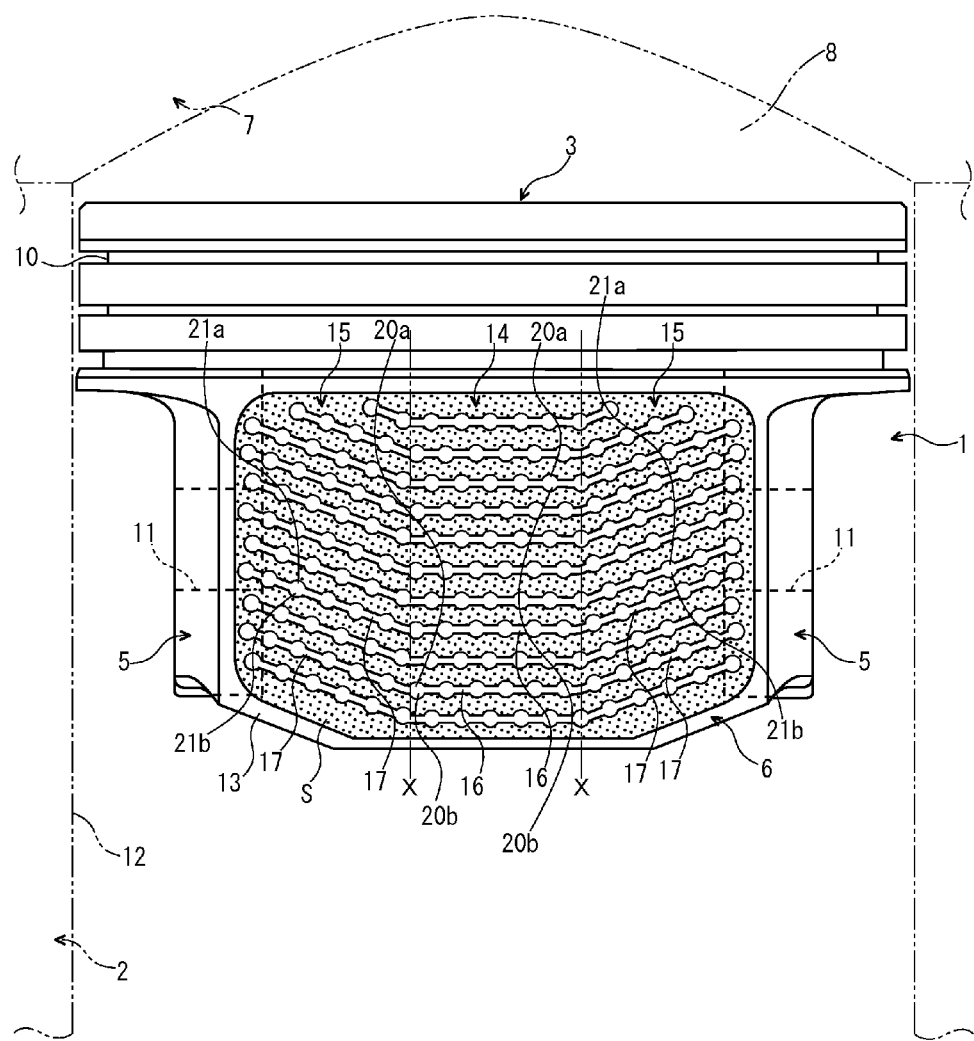
FIG. 5 is a side view showing a piston in accordance with a third embodiment of the invention.

Next, a third embodiment of the invention will be described using FIG. 5. Incidentally, constructions of portions other than the low surface pressure portions 15 of each skirt portion 6 are substantially the same as those in the second embodiment, and descriptions thereof will be omitted.

In the second embodiment, the horizontal grooves 16 of the high surface pressure portion 14 alone are provided with the upper-side retainer portions 20a and the lower-side retainer portions 20b. However, in this embodiment, the inclined grooves 17 of the low surface pressure portions 15 as well as the horizontal grooves 16 of the high surface pressure portion 14 are provided with upper-side retainer portions 21a and lower-side retainer portions 21b where the grooves partially expand.

The retainer portions 21a, 21b provided on the inclined grooves 17 are formed by patterning on resin coats. That is, the portions not provided with a resin coat (non-agent-applied portions) are the inclined grooves 17.

The retainer portions 21a, 21b have a semicircular shape, and the upper-side retainer portions 21a and the lower-side retainer portions 21b are provided at mutually corresponding positions. The configuration and arrangement of the retainer portions 21a, 21b can easily be realized by combining a linear pattern of the inclined grooves 17 with a perfect circular pattern.

The retainer portions 21a, 21b formed on one of the inclined groove 17 and the retainer portions 21a, 21b formed on another of the inclined groove 17 immediately above or below the one of the inclined groove 17 differ in position in the front and rear directions. That is, the positions of the retainer portions 21a, 21b of inclined grooves 17 disposed adjacent to each other in the up and down directions do not overlap with each other.

By providing the upper-side retainer portions 21a and the lower-side retainer portions 21b on not only the horizontal grooves 16 of the high surface pressure portion 14 but also the inclined grooves 17 of the low surface pressure portions 15, a certain amount of lubricating oil can be retained in not only the high surface pressure portion 14 but also the low surface pressure portions 15 when the piston 1 ascends or descends. Therefore, the function of retaining the lubricating oil on the skirt portions 6 further improves.

Incidentally, the retainer portions 21a, 21b provided on the inclined grooves 17, similar to the retainer portions 20a, 20b provided on the horizontal grooves 16, may also have a shape other than semicircular, such as a triangular or quadrangular shape. Furthermore, although the embodiment has been described in conjunction with the case where each inclined groove 17 is provided with both upper-side retainer portions 21a and lower-side retainer portions 21b, each inclined groove 17 may be provided with either only upper-side retainer portions 21a or only lower-side retainer portions 21b in other different embodiments.

Fourth Embodiment

Figure 6:
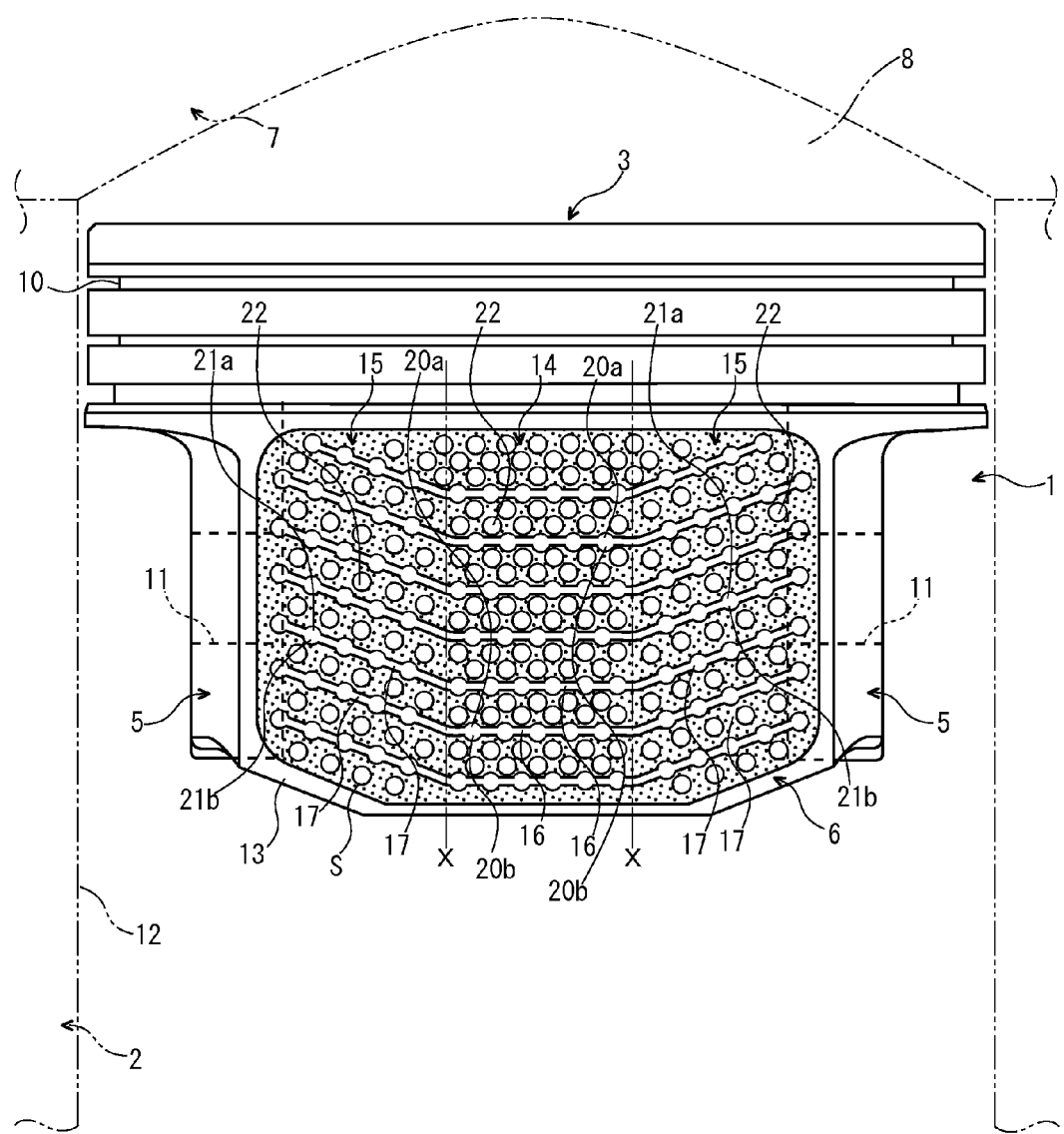
FIG. 6 is a side view showing a piston in accordance with a fourth embodiment of the invention.

Next, a fourth embodiment of the invention will be described using FIG. 6. Incidentally, constructions of portions other than the high surface pressure portion 14 and the low surface pressure portions 15 of each skirt portion 6 are substantially the same as those in the third embodiment, and descriptions thereof will be omitted.

In the fourth embodiment, in addition to the foregoing construction of the third embodiment, many recess portions 22 independent of the horizontal grooves 16 and the inclined grooves 17 are provided on the outer peripheral surface 13 of each skirt portion 6. The recess portions 22 are formed by patterning on resin coats. That is, the portions not provided with a resin coat (non-agent-applied portions) are the recess portions 22. The recess portions 22 have a perfect circular shape. In other words, the recess portions 22 are formed by a perfect circular pattern. In the embodiment, the recess portions 22 are disposed between the horizontal grooves 16, in two stages in the up and down directions, with each stage having plural recess portions 22, and the recess portions 22 are disposed between the inclined grooves 17, in a single stage, with the single stage having plural recess portions 22. Incidentally, above the horizontal groove 16 and the inclined grooves 17 of the uppermost stage recess portions 22 are disposed in three stages in the up and down directions, with each stage having plural recess portions 22.

The position of each recess portion 22 differs in the front and rear directions from the position of the retainer portions 20a, 20b, 21a, 21b or the recess portions 22 immediately above or below the recess portion 22. That is, recess portions 22 disposed adjacent to each other in the up and down directions or a recess portion 22 and the retainer portions 20a, 20b, 21a, 21b disposed adjacent to each other in the up and down directions are disposed so that their positions do not overlap with each other.

Due to the combination of the horizontal grooves 16, the inclined grooves 17, the retainer portions 20a, 20b and the retainer portions 21a, 21b with many recess portions 22 in the above-described manner, it becomes possible to always retain a certain amount of lubricating oil in the recess portions 22 as well, so that the function of retaining the lubricating oil in the skirt portions 6 can be further enhanced and the frictional resistance can be further reduced.

Although in this embodiment, the recess portions 22 are perfectly circular in shape, the recess portions 22 may also have a shape other than a perfect circular shape, such as the shape of an ellipse, a polygon, including a triangular, a quadrangle, etc. in other different embodiments.

Incidentally, the piston 1 in accordance with the present invention can be applied to internal combustion engines for all uses, such as engines of motor vehicles, motorcycles, snowmobiles or ATVs (All Terrain Vehicles), outboard engines, etc.

Explanation of Reference Numerals

1: piston for an internal combustion engine
6: skirt portion
12: cylinder inner surface
13: outer peripheral surface
14: high surface pressure portion
15: low surface pressure portion
16: horizontal groove
17: inclined groove
20a, 20b: retainer portion
21a, 21b: retainer portion
22: recess portion

What is claimed is:

1. A piston for an internal combustion engine comprising;
a crown portion provided at an upper end of the piston; and
a skirt portion extending downward from the crown portion,
wherein when the piston slides along a cylinder inner surface, a high surface pressure portion occurs at a center of the skirt portion and low surface pressure portions occur at both sides of the high surface pressure portion,
wherein the high surface pressure portion is provided with horizontal grooves extending in a direction orthogonal to a direction of motion of the piston;
wherein the horizontal grooves are spaced apart from one another by resin coated surfaces; and
the low surface pressure portions are provided with inclined grooves that are inclined downward toward the high surface pressure portion and that are connected to end portions of respective horizontal grooves.

2. The piston for the internal combustion engine according to claim 1, wherein the horizontal grooves are provided with respective retainer portions where the horizontal grooves partially expand in at least one of up and down directions.

3. The piston for the internal combustion engine according to claim 2, wherein the inclined grooves are provided with respective retainer portions where the inclined grooves partially expand in at least one of the up and down directions.

4. The piston for the internal combustion engine according to claim 1, wherein the horizontal grooves and the inclined grooves are spaced by a predetermined interval and are provided in plural stages in up and down directions, and recess portions independent of the horizontal grooves and the inclined grooves are provided between the horizontal grooves and between the inclined grooves.

5. The piston for the internal combustion engine according to claim 2, wherein the horizontal grooves are spaced by a predetermined interval and are provided in plural stages in up and down directions, and the retainer portion formed on one of the horizontal grooves and the retainer portion formed on another of the horizontal grooves immediately above or below the one of the horizontal grooves differ in position in front and rear directions.

6. The piston for the internal combustion engine according to claim 3, wherein the inclined grooves are spaced by a predetermined interval and are provided in plural stages in up and down directions, and the retainer portion formed on one of the inclined grooves and the retainer portion formed on another of the inclined grooves immediately above or below the one of the inclined grooves differ in position in front and rear directions.

* * * * *